United States Patent
Chen et al.

(10) Patent No.: US 11,800,590 B2
(45) Date of Patent: Oct. 24, 2023

(54) METHOD AND APPARATUS FOR SENDING BEAM RECOVERY INFORMATION, AND BEAM DETECTION METHOD AND APPARATUS

(71) Applicant: ZTE Corporation, Shenzhen (CN)

(72) Inventors: Yijian Chen, Shenzhen (CN); Bo Gao, Shenzhen (CN); Zhaohua Lu, Shenzhen (CN); Yu Ngok Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 177 days.

(21) Appl. No.: 16/767,781

(22) PCT Filed: Sep. 27, 2018

(86) PCT No.: PCT/CN2018/108140
§ 371 (c)(1),
(2) Date: May 28, 2020

(87) PCT Pub. No.: WO2019/105125
PCT Pub. Date: Jun. 6, 2019

(65) Prior Publication Data
US 2020/0367308 A1    Nov. 19, 2020

(30) Foreign Application Priority Data
Nov. 28, 2017    (CN) .......................... 201711218855.1

(51) Int. Cl.
*H04W 76/19*    (2018.01)
*H04W 24/04*    (2009.01)
(Continued)

(52) U.S. Cl.
CPC .......... *H04W 76/19* (2018.02); *H04W 24/04* (2013.01); *H04W 72/046* (2013.01); *H04W 72/21* (2023.01); *H04W 72/23* (2023.01)

(58) Field of Classification Search
CPC . H04W 24/04; H04W 56/001; H04W 72/042; H04W 72/046; H04W 72/0413; H04W 74/0833; H04W 76/19
(Continued)

(56) References Cited

U.S. PATENT DOCUMENTS 9,960,830 B2 *    5/2018    Yoo ..................... H04L 67/1042
10,687,335 B2 *    6/2020    Islam .................. H04W 72/042
(Continued)

FOREIGN PATENT DOCUMENTS

CN    108093481 A    5/2018

OTHER PUBLICATIONS

CMCC, "Discussion on UE triggered beam reporting for beam recovery", 3GPP TSG RAN WG1 Meeting #88, Feb. 13-17, 2017, R1-1703404.
(Continued)

*Primary Examiner* — Jason E Mattis
(74) *Attorney, Agent, or Firm* — CANTOR COLBURN LLP (57) ABSTRACT

Disclosed are a method and apparatus for sending beam recovery information, and a beam detection method and apparatus. The method for sending beam recovery information includes sending first beam recovery information, detecting downlink control information, and sending second beam recovery information according to a control information transmission configuration corresponding to the detected downlink control information.

10 Claims, 3 Drawing Sheets

(51) Int. Cl.
*H04W 72/044* (2023.01)
*H04W 72/21* (2023.01)
*H04W 72/23* (2023.01)

(58) Field of Classification Search
USPC .................................. 370/310, 328, 329
See application file for complete search history.

(56) References Cited

U.S. PATENT DOCUMENTS

| | | | | |
|---|---|---|---|---|
| 11,070,277 | B2* | 7/2021 | Park | H04B 7/0695 |
| 11,139,881 | B2* | 10/2021 | Harada | H04L 5/0053 |
| 2018/0048375 | A1* | 2/2018 | Guo | H04B 7/024 |
| 2019/0199412 | A1* | 6/2019 | Koskela | H04B 7/0695 |
| 2019/0335429 | A1* | 10/2019 | Takeda | H04W 72/046 |
| 2020/0014453 | A1* | 1/2020 | Takeda | H04W 56/001 |
| 2020/0336188 | A1* | 10/2020 | Wang | H04B 7/0404 |
| 2020/0367308 | A1* | 11/2020 | Chen | H04B 7/0617 |
| 2021/0120574 | A1* | 4/2021 | Takeda | H04W 72/042 |

OTHER PUBLICATIONS

European Search Report for corresponding application EP18883953; dated Aug. 16, 2021.
Interdigital Inc, "R1-1716469, 3GPP TSG RAN WG1 Meeting NR#3", Remaining Issues on Beam Recovery, Sep. 21, 2017.
International Search Report for corresponding application PCT/CN2018/108140 filed Sep. 27, 2018; dated Dec. 29, 2018.
Nokia, et al., "R1-1705961, 3GPP TSG RAN WG1 #88 bis", Beam Recovery in NR, Apr. 7, 2017.
Samsung, "R1-1717606, 3GPP TSG RAN WGI Meeting 90bis", BEam Failure Recovery, Oct. 13, 2017, pp. 1, 2, and 5-6.

* cited by examiner

METHOD AND APPARATUS FOR SENDING BEAM RECOVERY INFORMATION, AND BEAM DETECTION METHOD AND APPARATUS

CROSS-REFERENCES TO RELATED APPLICATIONS

This application is a national stage application filed under 35 U.S.C. 371 based on International Patent Application No. PCT/CN2018/108140, filed on Sep. 27, 2018, which claims priority to Chinese Patent Application No. 201711218855.1 filed with the CNIPA on Nov. 28, 2017, disclosures of which are incorporated herein by reference in their entireties.

TECHNICAL FIELD

The present application relates to communication technologies, and for example, to a method and apparatus for sending beam recovery information, and a beam detection method and apparatus.

BACKGROUND

In a radio communication system, a base station can adopt a narrower beam for transmission by using the beam forming capability of multiple antennas, effectively improving the transmission efficiency. However, the transmission using a narrow beam is sensitive to user equipment movement and beam link congestion. For example, at high frequencies, the congestion is severer, often causing link failure. Therefore, when a radio channel changes for the preceding reasons, the communication system needs to perform fast beam link switching and recovery to improve user experiences. The beam recovery process mainly includes the steps described below.

A beam is monitored. That is, it is determined whether the beam is invalid.

A beam is selected. That is, when the beam is invalid, the new beam is selected to reconstruct a transmission link.

Beam recovery information is sent. That is, the beam recovery information such as terminal indication information or beam indication information is sent.

Downlink control information (DCI) is detected. That is, transmission resources in at least one of time domain or frequency domain are divided into multiple control information transmission areas (control areas for short) according to an predetermined rule; control information transmission configurations corresponding to the multiple control areas are determined according to an predetermined rule; and the DCI on a detection control channel is detected according to the control information transmission configuration corresponding to each control area.

In the preceding DCI detection process, there are often some cases in which detection is required in multiple control areas at a beam recovery stage. For example, there are a control area corresponding to an original control information transmission configuration and a control area corresponding to a new control information transmission configuration, where the new control information transmission configuration is determined according to the beam indication information sent by a terminal. In this case, it is a simple way to divide multiple control areas, for example, two control areas, in at least one of the time domain or the frequency domain; then the terminal detects the DCI on the control channel in control area 1 according to the original control information transmission configuration; and the terminal detects the DCI on the control channel in control region 2 according to the new control information transmission configuration.

For another example, the detection is required in control areas corresponding to multiple new beams. In this case, it is common to detect the multiple new beams in a same control area.

SUMMARY

The present application provides a method and apparatus for sending beam recovery information, which can improve beam recovery efficiency.

The present application provides a method for sending beam recovery information. The method includes sending first beam recovery information, detecting downlink control information, and sending second beam recovery information according to a control information transmission configuration corresponding to the detected downlink control information.

The present application provides an apparatus for sending beam recovery information. The apparatus includes a first transmission module and a first detection module.

The first transmission module is configured to send first beam recovery information, and send second beam recovery information according to a control information transmission configuration corresponding to detected downlink control information.

The first detection module is configured to detect the downlink control information.

The present application provides an apparatus for sending beam recovery information. The apparatus includes a first processor and a first computer-readable storage medium. The first computer-readable storage medium stores first instructions. The first processor performs any method for sending beam recovery information described above when executing the first instructions.

The present application provides a computer-readable storage medium. The computer-readable storage medium stores a computer program. A processor performs any method for sending beam recovery information described above when executing the computer program.

The present application provides a beam detection method and apparatus, which can improve flexibility of beam detection, thereby improving resource utilization.

The present application provides a beam detection method. The method includes determining at least one of a control information transmission configuration or a data information transmission configuration corresponding to each of a plurality of beam groups into which a plurality of beams in a candidate beam set are grouped, selecting a beam from the candidate beam set and sending beam recovery information corresponding to the selected beam, and detecting the downlink control information according to at least one of a control information transmission configuration or a data information transmission configuration corresponding to a beam group to which the selected beam belongs.

The present application provides a beam detection apparatus. The apparatus includes a determination module, a selection and transmission module, and a second detection module.

The determination module is configured to determine at least one of a control information transmission configuration or a data information transmission configuration corresponding to each of a plurality of beam groups into which beams in a candidate beam set are grouped.

The selection and transmission module is configured to select a beam from the candidate beam set and send beam recovery information corresponding to the selected beam.

The second detection module is configured to detect downlink control information according to at least one of a control information transmission configuration or a data information transmission configuration corresponding to a beam group to which the selected beam belongs.

The present application provides a beam detection apparatus. The apparatus includes a second processor and a second computer-readable storage medium. The second computer-readable storage medium stores second instructions. The second processor performs any beam detection method described above when executing the second instructions.

The present application provides a computer-readable storage medium. The computer-readable storage medium stores a computer program. A processor performs any beam detection method described above when executing the computer program.

BRIEF DESCRIPTION OF DRAWINGS

The drawings are provided for a further understanding of the technical solutions of the present application, and constitute a part of the description. The drawings and the embodiments of the present application are used to explain the technical solutions of the present application, and not intended to limit the technical solutions of the present application.

DETAILED DESCRIPTION

The objects, technical solutions and advantages of the present application will be clearer from a detailed description of embodiments of the present application in conjunction with the drawings. It is to be noted that if not in collision, the embodiments and features therein in the present application may be combined with each other.

The steps illustrated in the flowcharts in the drawings may be performed by a computer system such as a group of computers capable of executing instructions. Further, although logical sequences are illustrated in the flowcharts, in some cases, the shown or described steps may be performed in sequences different from those described herein.

In the preceding DCI detection process, there are two problems described below.

Problem 1: At the DCI detection stage, if the terminal performs the detection according to both an original control information transmission configuration corresponding to an original beam and a new control information transmission configuration corresponding to a new beam, then there are four possibilities as shown in Table 1.

TABLE 1

|  | DCI Is Detected According to an Original Control Information Transmission Configuration | DCI Is Detected According to a New Control Information Transmission Configuration |
| --- | --- | --- |
| Case 1 | No DCI is detected. | DCI is detected. |
| Case 2 | DCI is detected. | No DCI is detected. |
| Case 3 | DCI is detected. | DCI is detected. |
| Case 4 | No DCI is detected. | No DCI is detected. |

In the related art, it is generally considered that case 2 or 3 in Table 1 does not exist if beam recovery occurs, so behaviors of a second communication node and a first communication node are considered only for cases 1 and 4. In practice, the beam detection stage is generally performed on the basis of a reference signal. That is, it is determined whether a beam is invalid according to the measured quality of the reference signal, thereby determining whether the transmission on a control channel is invalid. However, in practice, there may be the following cases that lead to the result that the transmission quality of the actual control channel is reflected inaccurately. For example, interference to which the monitored reference signal is subject is different from interference to which the control channel is subject; the threshold for determining a beam failure is too high; or during the detection period of the control channel, the measurement of the monitored pilot disappears due to a congestion factor, and a link can be recovered though an adjustment to a beam to be received by a terminal. Therefore, it is still possible to correctly detect the DCI on the original control channel at the DCI detection stage, i.e., the case 2 or 3 described above. However, there is no effective solution in the related art for the case 2 or 3, thereby resulting in less efficiency of the beam recovery.

For the case 2, the DCI is detected according to the original control information transmission configuration by the terminal, and no DCI is detected according to the new control information transmission configuration by the terminal. The following reasons which may be existed are described below.

1. The new beam is selected incorrectly. Since the new beam is selected according to reference signal receiving power (RSRP) without identifying signal to interference plus noise ratio (SINR) of the beam, there are possibilities that a beam with strong interference is selected. While for the original control channel, the original beam can still be used for communication in practice. So the terminal still uses the original beam for communication without switching a beam.

2. Beam recovery information sent by the terminal is not received by a base station.

For the case 3, A DCI is detected by the terminal according to the original control information transmission configuration, and the DCI is also detected by the terminal according to the new control information transmission configuration. A possible reason is that although the communication can be normally performed by the original beam can be normally used for the new beam has better quality.

Figure 1:
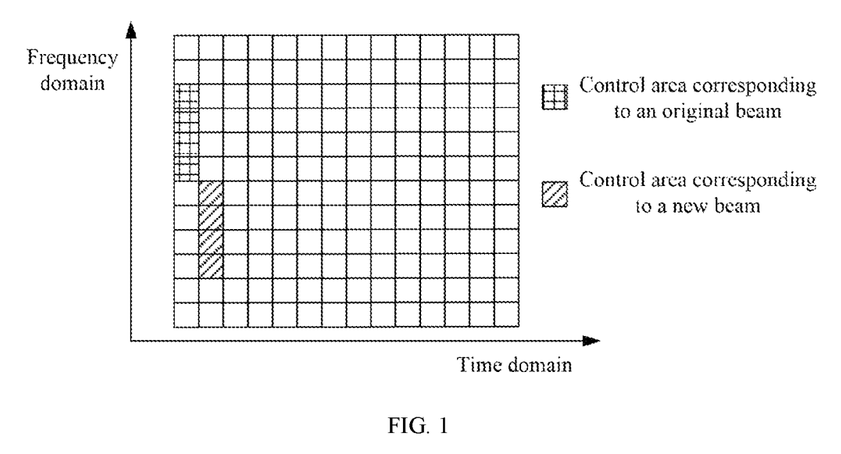
FIG. 1 is a schematic diagram of a control area corresponding to an original beam and a control area corresponding to all new beams according to the present application.

Problem 2: In the related art, the original beam corresponds to control information transmission configuration 1, and all new beams correspond to control information transmission configuration 2. FIG. 1 is a schematic diagram of a control area corresponding to an original beam and a control area corresponding to all new beams according to the present application. As shown in FIG. 1, the original beam corresponds to a control area, and all new beams correspond to another control area. Different new beams may be received according to different control channel quasi-colocation (QCL) assumptions. However, in the case that all new beams correspond to a same control information transmission configuration, since different beams correspond to different channels, transmission antennas and nodes may also be different. Therefore, this manner has flexibility limitation, thereby affecting resource multiplexing with other users on the same beam and reducing resource utilization.

Figure 2:
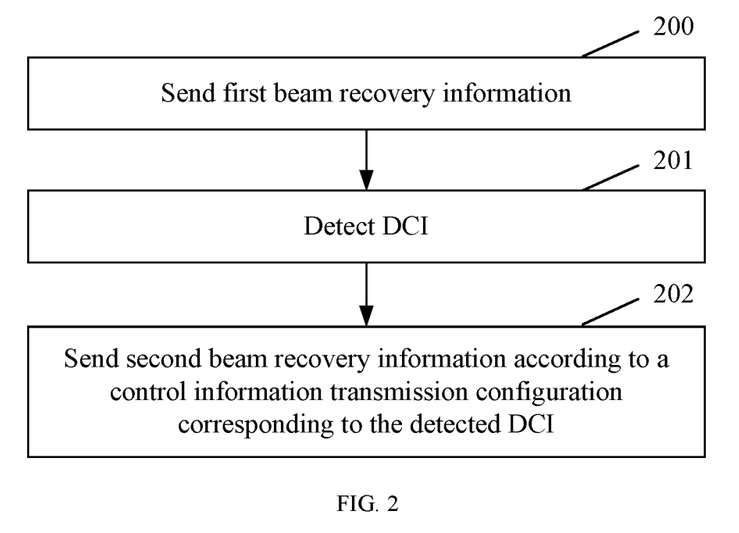
FIG. 2 is a flowchart of a method for sending beam recovery information according to the present application.

Referring to FIG. 2, the present application provides a method for sending beam recovery information. The method includes steps 200, 201 and 202.

In step 200, first beam recovery information is sent.

In this step, the first beam recovery information includes indication information about a first communication node (for example, a terminal), beam indication information or the like.

In an embodiment, the first beam recovery information is sent on a physical uplink control channel (PUCCH), and second beam recovery information is sent on a physical random access channel (PRACH). By this method, if a base station does not receive the first beam recovery information when the first beam recovery information is sent on the PUCCH, then the beam recovery information, that is, the second beam recovery information, is sent on the PRACH. Compared with the PUCCH, the PRACH has a higher probability of enabling the base station to receive the beam recovery information, thereby further improving the beam recovery efficiency.

In an embodiment, the second beam recovery information is indication information about a DCI detection result. According to this method, a second communication node acquires the DCI detection result through sending the indication information about the DCI detection result so that the beam recovery efficiency is further improved.

In step 201, DCI is detected.

In this step, the DCI may be detected according to a predetermined rule or a configuration of the second communication node (e.g., a base station).

For example, transmission resources in at least one of time domain or frequency domain are divided into multiple control information transmission areas (control areas for short) according to a first predetermined rule; control information transmission configurations corresponding to the multiple control areas are determined according to a second predetermined rule; and the DCI on a detection control channel is separately detected according to the control information transmission configuration corresponding to each control area.

In step 202, the second beam recovery information is sent according to the control information transmission configuration corresponding to the detected DCI.

Compared with the related art, the application includes determining at least one of a control information transmission configuration or a data information transmission configuration corresponding to each of beam groups into which beams in a candidate beam set are grouped, selecting a beam from the candidate beam set and sending beam recovery information corresponding to the selected beam, and detecting the downlink control information according to at least one of a control information transmission configuration or a data information transmission configuration corresponding to a beam group to which the selected beam belongs.

According to this method of the present application, the beams in the candidate beam set are divided into the beam groups, and each beam group corresponds at least one of the corresponding control information transmission configuration or the corresponding data information transmission configuration; then, the DCI is detected according to the at least one of the control information transmission configuration or the data information transmission configuration of the beam group to which the beam belongs instead of at least one of the control information transmission configuration or the data information transmission configuration corresponding to all beams, thereby improving beam detection flexibility and resource utilization.

In this step, the second beam recovery information may be same as the first beam recovery information, or may be different from the first beam recovery information.

For example, the second beam recovery information may include at least the indication information about the DCI detection result, such as indication information about whether the DCI is detected on the basis of the control information transmission configuration corresponding to the original beam, or indication information about whether the DCI is detected on the basis of the control information transmission configuration corresponding to the new beam.

In this step, the control information transmission configuration includes at least one of a format type of the DCI, a control area configuration (including a monitor occasion configuration), a mapping configuration (such as a distributed manner or a centralized manner), a configuration about the number of orthogonal frequency division multiplexing (OFDM) symbols occupied by the control channel, a precoding bundling granularity configuration of a resource element group (REG), a configuration about the number of rows of an interleaving matrix, or a scrambling code of the DCI.

In this step, the second beam recovery information may be directly sent according to the control information transmission configuration corresponding to the detected DCI.

For example, a transmission parameter of the second beam recovery information is determined according to the control information transmission configuration, and the second beam recovery information is sent according to the transmission parameter.

The transmission parameter may be at least one of a transmission position, a transmission sequence, transmit power, the number of times of repeated transmission, a transmit beam or the like.

For another example, the content of the second beam recovery information is determined and sent according to the control information transmission configuration. That is, the amount of the content of the second beam recovery information is different corresponding to different control information transmission configurations.

For another example, at least one of a mode or the content of the sent second beam recovery information is determined according to whether the control information transmission configuration corresponding to the detected DCI includes the control information transmission configuration corresponding to the original beam and the control information transmission configuration corresponding to the new beam.

In an embodiment, when the control information transmission configuration corresponding to the detected DCI includes the control information transmission configuration corresponding to the original beam without including the control information transmission configuration corresponding to the new beam (as in preceding case 2), if the first beam recovery information is sent on the PUCCH, it is possible that the second communication node does not receive the first beam recovery information sent by the first communication node. In this case, it is feasible to send the second beam recovery information on the PRACH to improve the probability that the second communication node receives the beam recovery information. In this case, the sent second beam recovery information may be same as the first beam recovery information, that is, the beam recovery information is retransmitted. The second beam recovery information may also be different from the first beam recovery information. For example, the indication information about the DCI detection result is sent.

Certainly, if it is because that the new beam is selected incorrectly, it is feasible to send the indication information about the DCI detection result to the second communication node to notify the second communication node of the DCI detection result, and it is also feasible to reselect a new beam and send beam recovery information of the reselected new beam to the second communication node.

When the control information transmission configuration corresponding to the detected DCI includes both the control information transmission configuration corresponding to the original beam and the control information transmission configuration corresponding to the new beam (as in preceding case 3), it is feasible to send the indication information about the DCI detection result to the second communication node to notify the second communication node of the DCI detection result.

It is also feasible to determine, according to the control information transmission configuration corresponding to the detected DCI, whether to send the second beam recovery information. The second beam recovery information is sent if it is determined that the second beam recovery information needs to be sent. This process ends if it is determined the second beam recovery information does not need to be sent.

For example, whether the second beam recovery information needs to be sent is determined according to whether the control information transmission configuration corresponding to the detected DCI includes the control information transmission configuration corresponding to the original beam and the control information transmission configuration corresponding to the new beam, and at least one of the mode or the content of the sent second beam recovery information is determined.

In an embodiment, when the control information transmission configuration corresponding to the detected DCI includes the control information transmission configuration corresponding to the original beam without including the control information transmission configuration corresponding to the new beam (as in preceding case 2), if the first beam recovery information is sent on the PUCCH, it is possible that the second communication node does not receive the first beam recovery information sent by the first communication node. In this case, it is determined that the second beam recovery information needs to be sent, and it is feasible to send the second beam recovery information on the PRACH to improve the probability that the second communication node receives the beam recovery information. The sent second beam recovery information may be same as the first beam recovery information, that is, the beam recovery information is retransmitted. The second beam recovery information may be different from the first beam recovery information, for example, the indication information about the DCI detection result is sent.

Certainly, if the new beam is selected incorrectly, it is determined that the second beam recovery information needs to be sent. In this case, it is feasible to send the indication information about the DCI detection result to the second communication node to notify the second communication node of the DCI detection result, and it is also feasible to reselect a new beam and send beam recovery information of the reselected new beam to the second communication node.

When the control information transmission configuration corresponding to the detected DCI includes both the control information transmission configuration corresponding to the original beam and the control information transmission configuration corresponding to the new beam (as in preceding case 3), it is determined that the second beam recovery information needs to be sent. In this case, it is feasible to send the indication information about the DCI detection result to the second communication node to notify the second communication node of the DCI detection result.

For another example, it is determined, according to information included in the control information transmission configuration corresponding to the detected DCI, whether the second beam recovery information needs to be sent.

In an embodiment, when the control information transmission configuration is the format type of the DCI, if the format type of the DCI includes two types, that is, DCI format 1 and DCI format 2, then it is determined that the second beam recovery information in response to DCI format 1 needs to be sent, and the second beam recovery information in response to DCI format 2 does not need to be sent.

When the control information transmission configuration is a control area, if there are two control areas, that is, time-frequency area 1 and time-frequency area 2, then it is determined the second beam recovery information needs to be sent if the detected DCI exists in time-frequency area 1, and the second beam recovery information does not need to be sent if no detected DCI exists in time-frequency area 2. It is possible that one of time-frequency area 1 and time-frequency area 2 corresponds to the original beam and the other one of time-frequency area 1 and time-frequency area 2 corresponds to the new beam, or that the two time-frequency areas correspond to different new beams.

When the control information transmission configuration is a scrambling code of the DCI, if there are two scrambling codes, that is, scrambling code 1 and scrambling code 2, then it is determined that the second beam recovery information needs to be sent if the DCI is detected through descrambling a descrambling sequence corresponding to scrambling code 1, and that the second beam recovery information does not need to be sent if the DCI is detected through descrambling a descrambling sequence corresponding to scrambling code 2.

When the corresponding control information transmission configuration is other information, it is feasible to determine whether the second beam recovery information needs to be sent in a similar manner, which is not repeated here.

In an embodiment, for cases 1 and 4 and the DCI detection corresponding to multiple new beams, it is feasible to send the beam recovery information by using the method for sending beam recovery information of the present application.

According to the method for sending beam recovery information of the present application, the second beam recovery information is sent according to the control information transmission configuration corresponding to the detected DCI so that beam recovery efficiency is improved.

In an embodiment, the first beam recovery information is sent on the PUCCH and the second beam recovery information is sent on the PRACH. Through this method, if the second communication node does not receive the first beam recovery information when the first beam recovery information is sent on the PUCCH, then the beam recovery information, that is, the second beam recovery information, is sent on the PRACH. Compared with the PUCCH, the PRACH has a higher probability of enabling the base station to receive the beam recovery information, thereby further improving the beam recovery efficiency.

In an embodiment, when the second beam recovery information is completely or partially same as the first beam recovery information, the first beam recovery information is sent on the PUCCH and the second beam recovery information is sent on the PRACH.

In an embodiment, the second beam recovery information is the indication information about the DCI detection result. According to this method, the second communication node acquires the DCI detection result through the indication information about the DCI detection result so that the second communication node makes a further decision on the basis of the DCI detection result, further improving the beam recovery efficiency.

Figure 3:
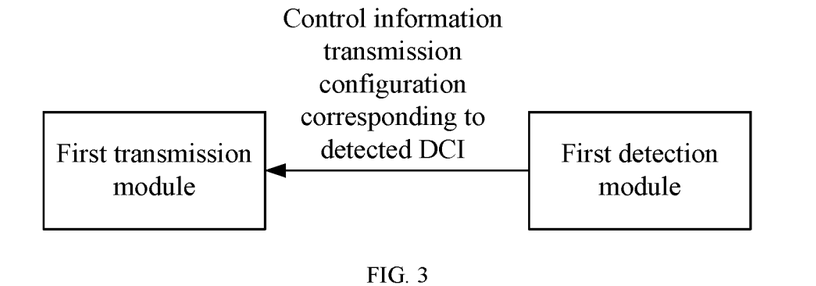
FIG. 3 is a structure diagram of an apparatus for sending beam recovery information according to the present application.

Referring to FIG. 3, the present application provides an apparatus for sending beam recovery information. The apparatus includes a first transmission module (that is, a transmission module) and a first detection module.

The first transmission module is configured to send first beam recovery information, and send second beam recovery information according to a control information transmission configuration corresponding to detected DCI.

The first detection module is configured to detect the downlink control information (DCI).

In an embodiment, the first transmission module is configured to send the first beam recovery information, determine, according to the control information transmission configuration, whether the second beam recovery information needs to be sent, and send the second beam recovery information if the second beam recovery information needs to be sent.

In an embodiment, the first transmission module is configured to send the first beam recovery information, determine a transmission parameter of the second beam recovery information according to the control information transmission configuration, and send the second beam recovery information according to the transmission parameter; and/or determine content of the second beam recovery information and send the content according to the control information transmission configuration.

In an embodiment, the first transmission module is further configured to send the first beam recovery information on a physical uplink control channel and send the second beam recovery information on a physical random access channel.

In an embodiment, the second beam recovery information is completely or partially same as the first beam recovery information.

In an embodiment, the second beam recovery information includes at least indication information about a DCI detection result.

In an embodiment, the control information transmission configuration includes at least one of a format type of the DCI, a control area configuration, a mapping configuration, a configuration about the number of orthogonal frequency division multiplexing (OFDM) symbols occupied by a control channel, a precoding bundling granularity configuration of a resource element group (REG), a configuration about the number of rows of an interleaving matrix, or a scrambling code of the DCI.

Figure 4:
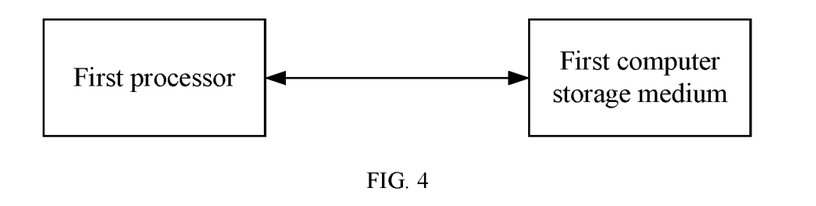
FIG. 4 is a structure diagram of another apparatus for sending beam recovery information according to the present application.

Referring to FIG. 4, the present application provides an apparatus for sending beam recovery information. The apparatus includes a first processor and a first computer-readable storage medium. The first computer-readable storage medium stores first instructions. The first processor performs any method for sending beam recovery information described above when executing the first instructions.

The present application provides a computer-readable storage medium. The computer-readable storage medium stores a computer program. A processor performs any method for sending beam recovery information described above when executing the computer program.

In a multi-beam transmission communication system, a beam or a beam group may be regarded as a virtual sector, and each cell is composed of multiple virtual sectors. To multiplex resources better and improve resource utilization, control information transmission configuration corresponding to the same virtual sector is shared by multiple users in the virtual sector, and different control information transmission configurations corresponding to different virtual sectors may be different. Resources are multiplexed between virtual sectors in a space division mode, and resources are multiplexed in a virtual sector in a time-frequency division mode.

During beam recovery, candidate beams may have different directions, so multiple virtual sectors may be involved. If there is only one control information transmission configuration for all candidate beams, the all candidate beams can only use the same control information transmission configuration so that resource utilization in different virtual sectors is affected.

Figure 5:
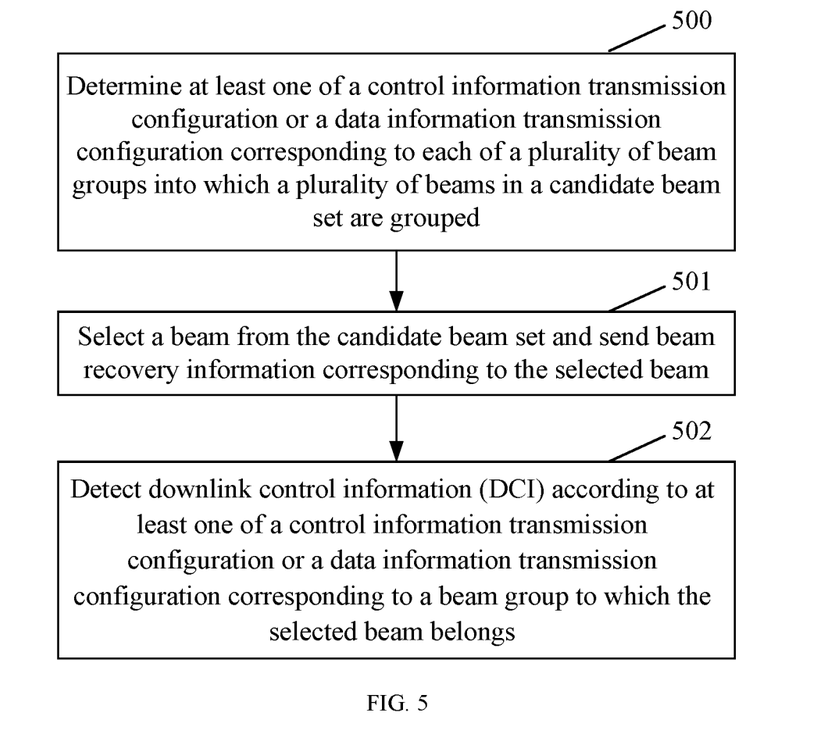
FIG. 5 is a flowchart of a beam detection method according to the present application.

Referring to FIG. 5, the present application provides a beam detection method. The method includes steps 500, 501 and 502.

In step 500, at least one of a control information transmission configuration or a data information transmission configuration corresponding to each of a plurality of beam groups into which a plurality of beams in a candidate beam set are grouped is determined.

In the present application, beams may be represented as reference signals or reference resources transmitted by using the beams. For example, grouping the beams may be embodied as grouping the reference signals or grouping the reference resources.

In an embodiment, the beams in the candidate beam set may be grouped by a first communication node, or the beams in the candidate beam set may be grouped by a second communication node.

In an embodiment, the beams in the candidate beam set are grouped according to one of a predetermined rule, grouping indication signaling sent by the second communication node, or a reference signal type corresponding to a beam.

For example, the beams in the candidate beam set may be grouped into M beam groups according to the predetermined rule, where M is an integer greater than or equal to 1. This predetermined rule may be any rule, for example, a rule of grouping according to the grouping indication signaling sent by the second communication node (for example, a base station) or a rule of grouping according to the reference signal type corresponding to the beam. Certainly, the grouping may be performed according to other rules, which are not limited in this application.

Alternatively, the beams in the candidate beam set are grouped into M beam groups according to the grouping indication signaling sent by the second communication node. The grouping indication signaling includes beam grouping information, and the beam grouping information may be a beam grouping mode or the like.

Alternatively, the beams in the candidate beam set are grouped into M beam groups according to reference signal type corresponding to the beam. For example, beams with a reference signal type of a synchronization signal (SS) are grouped, and beams with a reference signal type of a channel state information reference signal (CSI) are grouped. Alternatively, beams with a reference signal type is a CSI-RS associated with a same SS are grouped. Certainly, the preceding division modes are only several examples of grouping modes, and the grouping modes in the examples described above can be combined with each other.

In an embodiment, at least one of a control information transmission configuration or a data information transmission configuration corresponding to a beam group may be determined according to a predetermined rule. This predetermined rule may be any rule, for example, a rule of determining the at least one of the control information transmission configuration or the data information transmission configuration corresponding to the beam group according to configuration information sent by the second communication node.

Alternatively, the at least one of the control information transmission configuration or the data information transmission configuration corresponding to the beam group is determined according to configuration signaling sent by the second communication node. The configuration information includes the at least one of the control information transmission configuration or the information transmission configuration corresponding to the beam group.

In an embodiment, the control information transmission configuration includes combinations of any one or more of a format type of the DCI, a control area configuration (including a monitor occasion configuration), a mapping configuration, a configuration about the number of orthogonal frequency division multiplexing (OFDM) symbols occupied by a control channel, a precoding bundling granularity configuration of a resource element group (REG), a configuration about the number of rows of an interleaving matrix, or a scrambling mode of the DCI.

In an embodiment, the data information transmission configuration includes at least one of a multiple-input multiple-output (MIMO) transmission parameter, a reference signal (RS) parameter, a hybrid automatic repeat request (HARQ) parameter or codeblock group (CBG), a random access (RA) parameter or a random access type, a transmission sub-band (BWP) parameter, or a modulation and coding scheme (MCS) table.

The MIMO transmission parameter includes combinations of any one or more of: a max layer number, a codebook subset restriction (CSR)/codebook (CB) parameter, an uplink sub-band size (UL SB size) or a precoding bundling granularity.

The RS parameter includes combinations of any one or more of a demodulation reference signal (DMRS) configuration, a phase noise reference signal (PTRS) configuration (such as ON/OFF) or a tracking reference signal (TRS) configuration.

In step 501, a beam is selected from the candidate beam set and beam recovery information corresponding to the selected beam is sent.

In the present application, the beam recovery information includes indication information about the first communication node (for example, a terminal) and beam indication information. The indication information about the first communication node is configured to indicate which communication node it is, and the beam indication information is configured to indicate a newly selected beam.

The beam indication may be embodied as having a QCL relationship with a reference signal or a reference resource for transmitting the beam.

In step 502, the downlink control information (DCI) is detected according to at least one of a control information transmission configuration or a data information transmission configuration corresponding to a beam group to which the selected beam belongs.

Figure 6:
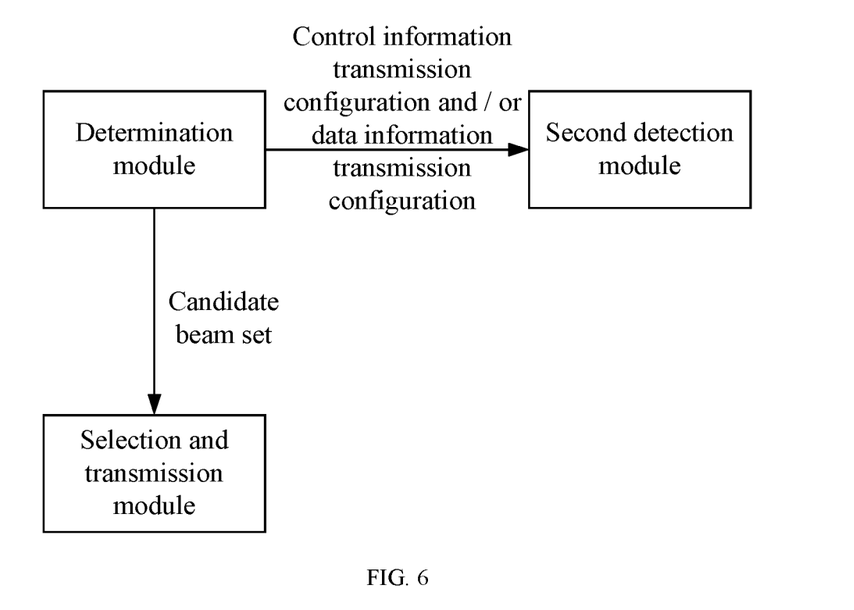
FIG. 6 is a structure diagram of a beam detection apparatus according to the present application.

Referring to FIG. 6, the present application provides a beam detection apparatus. The apparatus includes a determination module, a selection and transmission module and a second detection module.

The determination module is configured to determine at least one of a control information transmission configuration or a data information transmission configuration corresponding to each of a plurality of beam groups into which beams in a candidate beam set are grouped.

The selection and transmission module is configured to select a beam from the candidate beam set and send beam recovery information corresponding to the selected beam.

The second detection module is configured to detect downlink control information according to at least one of a control information transmission configuration or a data information transmission configuration corresponding to a beam group to which the selected beam belongs.

In an embodiment, the first determination module is configured to:
determine, according to a predetermined rule, at least one of: the control information transmission configurations or the data information transmission configurations corresponding to the plurality of beam groups; or
determine, according to configuration signaling sent by a second communication node, at least one of: the control information transmission configurations or the data information transmission configurations corresponding to the plurality of beam groups.

Figure 7:
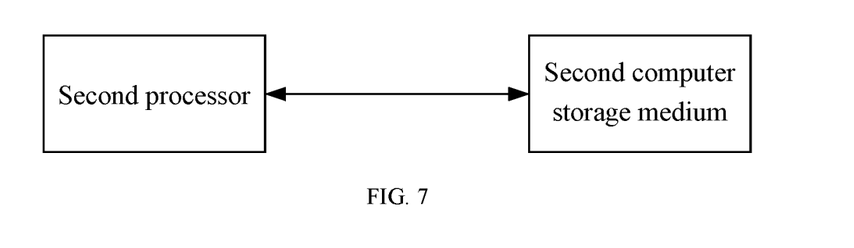
FIG. 7 is a structure diagram of another beam detection apparatus according to the present application.

Referring to FIG. 7, the present application provides a beam detection apparatus. The apparatus includes a second processor and a second computer-readable storage medium. The second computer-readable storage medium stores second instructions. The second processor performs any beam detection method described above when executing the second instructions.

The present application provides a computer-readable storage medium. The computer-readable storage medium stores a computer program. A processor performs any beam detection method described above when executing the computer program.

What is claimed is:

1. A method for sending beam recovery information, executed by a first communication node, comprising:
sending first beam recovery information;
detecting downlink control information; and
sending second beam recovery information according to a control information transmission configuration corresponding to the detected downlink control information, wherein the second beam recovery information comprises indication information about a downlink control information detection result, and the indication information about the downlink control information detection result comprises indication information about whether the downlink control information is detected on the basis of control information transmission configuration corresponding to an original beam, or indication information about whether the downlink control information is detected on the basis of control information transmission configuration corresponding to a new beam;

wherein the first beam recovery information is sent on a physical uplink control channel and the second beam recovery information is sent on a physical random access channel.

2. The method of claim 1, wherein before sending the second beam recovery information according to the control information transmission configuration corresponding to the detected downlink control information, the method comprises:

determining, according to the control information transmission configuration, whether the second beam recovery information needs to be sent, and sending the second beam recovery information if the second beam recovery information needs to be sent.

3. The method of claim 1, wherein sending the second beam recovery information according to the control information transmission configuration corresponding to the detected downlink control information comprises at least one of:

determining a transmission parameter of the second beam recovery information according to the control information transmission configuration, and sending the second beam recovery information according to the transmission parameter; or determining, according to the control information transmission configuration, content of the second beam recovery information, and sending the content.

4. The method of claim 1, wherein the second beam recovery information is completely or partially same as the first beam recovery information.

5. The method of claim 1, wherein the second beam recovery information comprises indication information about a detection result of the downlink control information.

6. The method of claim 1, wherein the control information transmission configuration comprises at least one of:

a format type of the downlink control information, a control area configuration, a mapping configuration, a configuration about a number of orthogonal frequency division multiplexing symbols occupied by a control channel, a precoding bundling granularity configuration of a resource element group, a configuration about a number of rows of an interleaving matrix, or a scrambling code of the downlink control information.

7. A non-transitory computer-readable storage medium, which is configured to store a computer program, wherein a processor is configured to, when executing the computer program, perform the method for sending beam recovery information of claim 1.

8. The method of claim 2, wherein sending the second beam recovery information according to the control information transmission configuration corresponding to the detected downlink control information comprises at least one of:

determining a transmission parameter of the second beam recovery information according to the control information transmission configuration, and sending the second beam recovery information according to the transmission parameter; or determining, according to the control information transmission configuration, content of the second beam recovery information, and sending the content.

9. The method of claim 2, wherein the second beam recovery information comprises indication information about a detection result of the downlink control information.

10. An apparatus for sending beam recovery information, comprising a first processor and a first computer-readable storage medium, wherein the first computer-readable storage medium is configured to store first instructions, and the first processor is configured to, when executing the first instructions, perform the following steps:

sending first beam recovery information;

detecting downlink control information; and sending second beam recovery information according to a control information transmission configuration corresponding to the detected downlink control information, wherein the second beam recovery information comprises indication information about a downlink control information detection result, and the indication information about the downlink control information detection result comprises indication information about whether the downlink control information is detected on the basis of control information transmission configuration corresponding to an original beam, or indication information about whether the downlink control information is detected on the basis of control information transmission configuration corresponding to a new beam;

wherein the first beam recovery information is sent on a physical uplink control channel and the second beam recovery information is sent on a physical random access channel.

* * * * *